United States Patent [19]
Gilmore et al.

[11] Patent Number: 5,861,844
[45] Date of Patent: Jan. 19, 1999

[54] METHOD AND APPARATUS FOR PROVIDING REDUNDANT COVERAGE WITHIN A CELLULAR COMMUNICATION SYSTEM

[75] Inventors: Robert P. Gilmore; Daniel Laramie, both of San Diego, Calif.

[73] Assignee: QUALCOMM Incorporated, San Diego, Calif.

[21] Appl. No.: 347,532

[22] Filed: Nov. 29, 1994

[51] Int. Cl.$^6$ .............................. H01Q 3/02; H01Q 3/12
[52] U.S. Cl. .......................................... 342/374; 455/423
[58] Field of Search .................................. 342/373, 374; 455/422, 423

[56] References Cited

U.S. PATENT DOCUMENTS 5,146,230  9/1992  Hules ....................................... 342/374
5,565,873  10/1996  Dean ....................................... 342/372

*Primary Examiner*—Theodore M. Blum
*Attorney, Agent, or Firm*—Russell B. Miller; Linli L. Golden

[57] ABSTRACT

A system and method for using a sectored antenna arrangement within a cellular base station to provide redundant coverage within the surrounding cell is disclosed herein. An antenna feed network connects elements of the sectored antenna arrangement to a set of communication transceivers, wherein the feed network includes a combiner array for combining selected ones of the antenna beams upon failure of one of the communication transceivers. A switch network serves to provide the resultant combined beam to an operative one of the communication transceivers.

Alternately, the sectored antenna arrangement includes an antenna array having a plurality of switchable antenna elements, each connected to one of the communication transceivers. The switchable antenna elements project a set of variable-width antenna beams over the plurality of cell sectors. Upon one of the communication transceivers becoming inoperative, an antenna control network operates to adjust beam width of a selected one of the variable-width antenna beams by switching configuration of an associated one of the switchable antenna elements.

In another approach each antenna within a primary array is disposed to project a beam over a single sector, while each element within a redundant array is designed to encompass a pair of adjacent sectors. Upon one of the transceivers becoming inoperative, a transceiver nominally assigned to cover a sector neighboring the failed sector is connected to the element within the redundant array encompassing both the failed and neighboring sectors.

20 Claims, 9 Drawing Sheets

METHOD AND APPARATUS FOR PROVIDING REDUNDANT COVERAGE WITHIN A CELLULAR COMMUNICATION SYSTEM

BACKGROUND OF THE INVENTION

I. Field of the Invention

The present invention relates to cellular communication systems, and, more particularly, to a novel and improved method and apparatus for providing redundant coverage within a cellular communications system using a sectored antenna arrangement array.

II. Description of the Related Art

Figure 1:
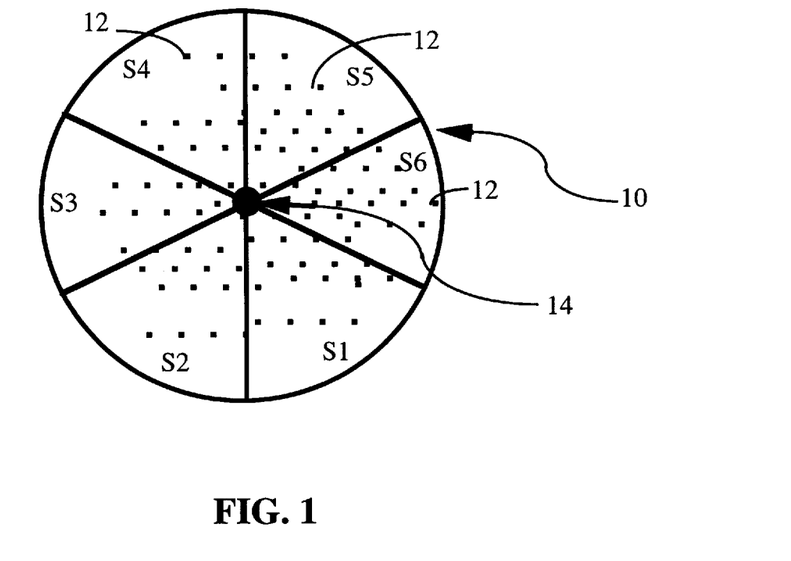
FIG. 1 shows an exemplary six-sectored cell of a cellular communications system in which are disposed a plurality of subscriber units and a base station.

In cellular communication systems, communication between a base station and subscriber units is facilitated by partitioning the surrounding cell into "sectors". Referring to FIG. 1, there is shown a first exemplary cell 10 in which are disposed a plurality of subscriber units 12 and a base station 14. As is indicated by FIG. 1, the cell 10 is partitioned into six sectors S1–S6. The base station 14 may include a set of six fixed-beam antennas (not shown) dedicated to facilitating communication with subscriber units in the sectors S1–S6, respectively.

Within the base station 14, a separate communications transceiver will typically be coupled to each of the fixed-beam antennas. Each communications transceiver is responsible for processing the information signals exchanged between the base station 14 and the subscriber units 12 within a particular sector. Each communications transceiver will generally include, for example, signal amplifiers, frequency up/downconverters, and baseband signal processing apparatus.

Since each communications transceiver is dedicated to a particular sector, the failure of one of the transceivers results in the interruption of service to the subscriber units 12 within the associated sector. Accordingly, in order to prevent service interruption it has been common practice to provide redundant communications hardware within each cell-site base station. For example, in the event of failure of a high-power amplifier (HPA) within a given communications transceiver, a spare HPA may be switched into the transceiver during replacement of the inoperative HPA.

Unfortunately, the provision of spare communications hardware within each cell-site increases system cost and complexity. Moreover, since identification of the specific hardware element causing a given communications transceiver to become inoperative may require sophisticated monitoring apparatus, it is often necessary to provide at least one entire redundant transceiver unit.

It is therefore an object of the present invention to provide a method and apparatus for providing redundant sector coverage within a cellular communications system without reliance upon spare communications hardware.

SUMMARY OF THE INVENTION

The present invention provides a system and method for using a sectored antenna array within a cellular base station to provide redundant coverage within the surrounding cell. The present invention may be implemented within a cellular communication system in which a cell-site is used to communicate information signals to and from users within a first cell having a plurality of sectors. The cell-site includes a set of communication transceivers, each of which is in communication through a sectored antenna arrangement with users in a corresponding cell sector.

In a preferred embodiment of the invention the sectored antenna arrangement includes an antenna array having a plurality of antenna elements for projecting a corresponding plurality of antenna beams over the cell sectors. An antenna feed network connects the antenna elements to selected ones of the communication transceivers, wherein the feed network includes a combiner array for combining selected ones of the antenna beams upon failure of one of the communication transceivers. A switch network serves to provide the resultant combined beam to an operative one of the communication transceivers.

In an alternately preferred embodiment the sectored antenna arrangement includes an antenna array having a plurality of switchable antenna elements, each connected to one of the communication transceivers. The switchable antenna elements project a set of variable-width antenna beams over the plurality of cell sectors. Upon one of the communication transceivers becoming inoperative, an antenna control network operates to adjust beam width of a selected one of the variable-width antenna beams by switching configuration of an associated one of the switchable antenna elements.

In this way the present invention allows for "seamless" system operation by enabling the inoperative transceiver to be repaired or replaced without interruption of user service.

BRIEF DESCRIPTION OF THE DRAWINGS

Additional objects and features of the invention will be more readily apparent from the following detailed description and appended claims when taken in conjunction with the drawings, in which:

DESCRIPTION OF THE PREFERRED EMBODIMENT

I. Introduction

Figure 2:
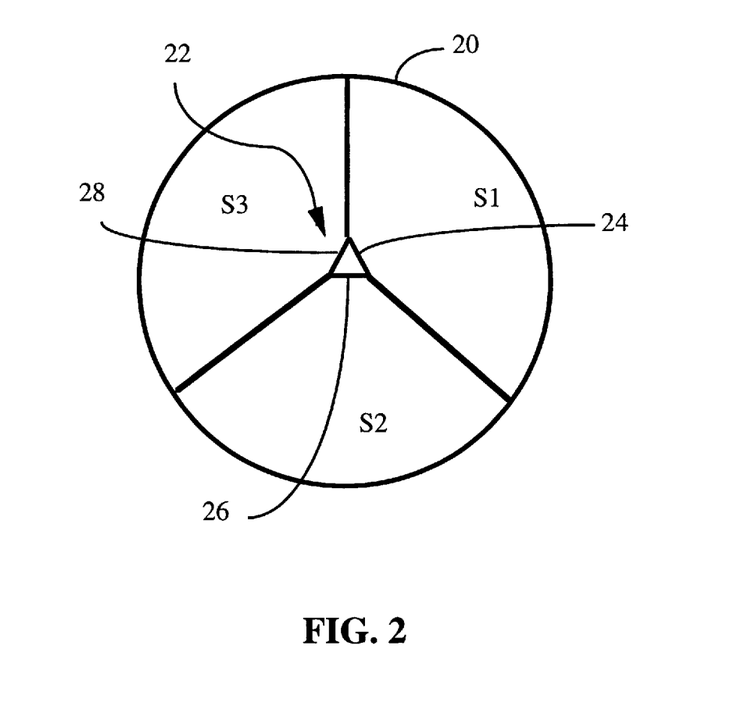
FIG. 2 provides an illustrative representation of an exemplary sectored cell in which is included a base station configured to provide redundant sector coverage in accordance with the invention.

Turning now to FIG. 2, there is shown an exemplary sectored cell 20 included within a cellular communication system comprised of a number of other such cells (not shown). Included within the cell is a base station 22, the antenna of which is used to facilitate communication with subscriber users disposed within the three cell sectors S1–S3. In an exemplary embodiment the base station antenna is implemented as a sectored antenna arrangement having a set of three fixed-beam antenna elements 24, 26, 28. The fixed-beam antenna elements 24, 26, 28 operate to project a set of 120 degree beams over the sectors S1–S3, it being understood that a greater number of antenna elements could be employed to effect increased sectorization within the cell 20.

Communication between the base station 22 and subscriber users within the cell 20 may be carried out using any one of a number of multiple access communication schemes familiar to those skilled in the art. The use of code division multiple access (CDMA) modulation techniques is one of several such methods for facilitating communications in systems accommodating a large number of users. Other multiple access communication system techniques, such as time division multiple access (TDMA), frequency division multiple access (FDMA) and AM modulation schemes such as amplitude companded single sideband are known in the art. However, the spread spectrum modulation technique of CDMA has significant advantages over these modulation techniques for multiple access communication systems. The use of CDMA techniques in a multiple access communication system is disclosed in U.S. Pat. No. 4,901,307, issued Feb. 13, 1990, entitled "SPREAD SPECTRUM MULTIPLE ACCESS COMMUNICATION SYSTEM USING SATELLITE OR TERRESTRIAL REPEATERS", assigned to the assignee of the present invention, the disclosure of which is incorporated by this reference.

The CDMA techniques as disclosed in '307 patent contemplate the use of coherent modulation and demodulation for both directions of the link in mobile-satellite communications. Accordingly, disclosed therein is the use of a pilot carrier signal as a coherent phase reference for the satellite-to-mobile unit link and the base station-to-mobile unit link. In the terrestrial cellular environment, however, the severity of multipath fading with the resulting phase disruption of the channel, as well as the power required to transmit a pilot carrier signal from the mobile unit, precludes usage of coherent demodulation technique for the mobile unit-to-base station link. U.S. Pat. No. 5,102,459 entitled "SYSTEM AND METHOD FOR GENERATING SIGNAL WAVEFORMS IN A CDMA CELLULAR TELEPHONE SYSTEM", issued Jun. 25, 1990, assigned to the assignee of the present invention, the disclosure of which is incorporated by this reference, provides a means for overcoming the adverse effects of multipath in the mobile unit-to-base station link by using noncoherent modulation and demodulation techniques.

In particular, the inventive redundant sectorization technique may find application within cellular communication systems in which are employed any of the aforementioned multiple access and modulation techniques. As is described hereinafter, in one aspect the present invention is directed to a method and apparatus for providing redundant or "backup" antenna coverage in order to prevent hardware failure within the base station 22 from causing interruption in service to one or more of the cell sectors S1–S3.

Briefly, in normal operation each base station includes a separate communications module or transceiver dedicated to servicing users within the individual cell sectors. Each communications module will nominally be connected to a separate antenna element, each of which are directed to a different cell sector. In a preferred embodiment, a switch matrix is provided for selectively connecting one or more of the antenna elements to selected ones of the communication modules. Upon failure of a given base station communications module, the switch matrix may couple the antenna element nominally connected to the failed module to an operative communications module associated with a neighboring sector. In this way the operative communications module is used to provide service to each of the adjacent sectors until the failed communications module is replaced.

2. Detailed Description of a Preferred Implementation

Figure 3:
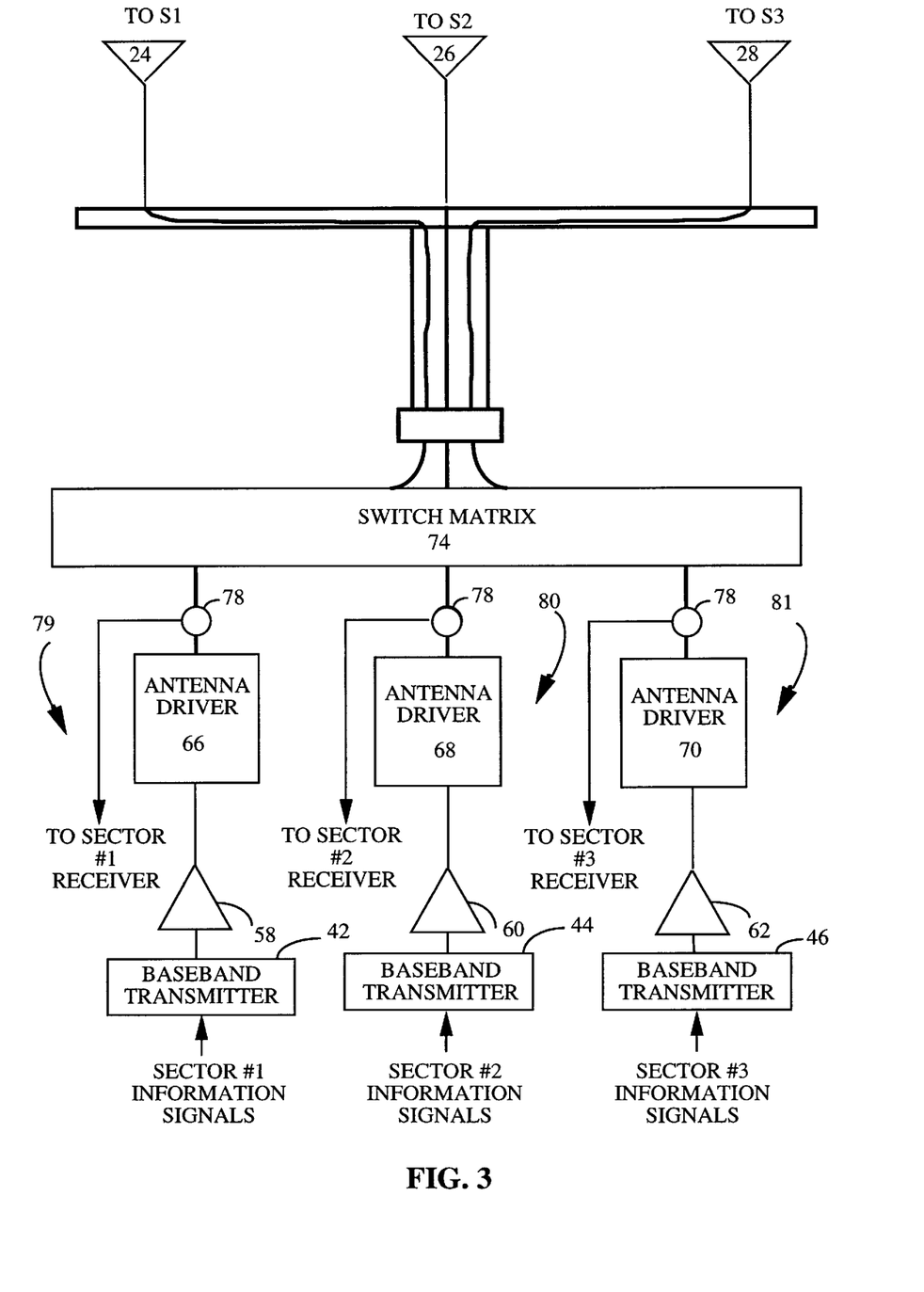
FIG. 3 shows a block diagram representation of the architecture of an exemplary base station transmitter network configured to provide redundant sectorization.

Turning now to FIG. 3, there is shown a block diagram representation of the architecture of an exemplary base station transmitter network configured to provide redundant sectorization in accordance with one aspect of the invention. The base station transmitter network is seen to include first, second and third baseband transmitters 42, 44, and 46 for processing baseband information signals to be transmitted over traffic channels associated with the first (S1), second (S2) and third (S3) cell sectors. Within the transmitters 42, 44 and 46 the information signals are bandpass filtered, shifted to an RF carrier frequency, and provided to transmit amplifiers 58, 60 and 62. The amplified signals produced by the amplifiers 58, 60 and 62 comprise the information signals to be provided via an RF carrier to cell sectors S1, S2 and S3 respectively. The outputs of each of the amplifiers 58, 60 and 62 are respectively connected to antenna drivers 66, 68 and 70. As is indicated by FIG. 3, the antenna drivers 66, 68 and 70 are coupled to a switch matrix 74.

The switch matrix 74 provides a switchable connection between the antenna element associated with each cell sector and the antenna drivers 66, 68 and 70. Each antenna driver 66, 68 and 70 may provide additional signal amplification, and may also provide signal isolation from the antenna element(s) connected thereto. During normal operation the switch matrix 74 is set so as to connect antenna driver 66 to antenna element 24, antenna driver 68 to antenna element 26, and antenna driver 70 to antenna element 28. Again, the antenna elements 24, 26 and 28 respectively project antenna beams over the cell sectors S1–S3.

As is indicated by FIG. 3, interposed between each of the antenna drivers 66, 68 and 70 and the switch matrix 74 is a duplexer 78. Each duplexer 78 operatively connects one of the antenna drivers to the switch matrix during operation of the cell-site in a transmission mode. During receive mode, the duplexers 78 couple the switch matrix 74 to a set of receive networks (not shown) respectively associated with sectors S1, S2 and S3. Each transmitter/receiver pair forms a communications transceiver disposed to facilitate duplexed communication with the users of one of the cell sectors. The communications transceivers for sectors #1, #2 and #3 are hereinafter respectively identified by the reference numerals 79, 80 and 81.

Figure 4:
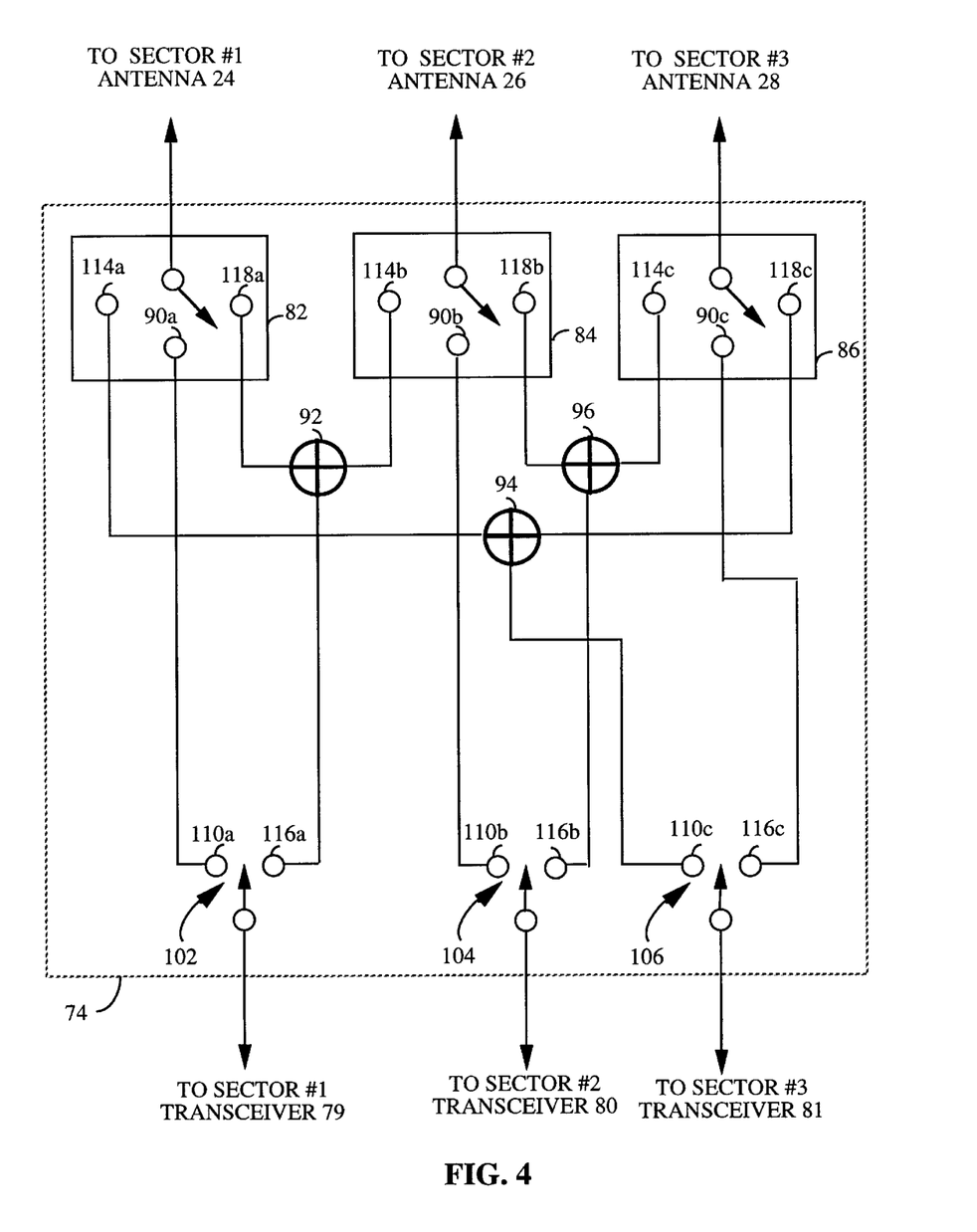
FIG. 4 depicts a preferred implementation of a switch matrix comprised of an array of single-pole, triple-throw switches respectively coupled to base station antenna elements.

Referring now to FIG. 4, in a preferred implementation of the switch matrix 74 an array of single-pole, triple-throw switches 82, 84 and 86 are respectively coupled to the antenna elements 24, 26 and 28. The switch matrix 74 further includes a set of three-port combiner elements 92, 94 and 96, as well as an array of single-pole, double-throw switches 102, 104 and 106. Each of the triple-throw switches 82, 84 and 86 are nominally set to center throw positions 90a–c, while the double-throw switches 102 and 104 are nominally set to left positions 110a–b and the double-throw switch 106 is set to right position 116c. These settings are used when each of the communication transceivers are operational, and results in one-to-one coupling between each communication transceiver and one of the antenna elements 24, 26 and 28.

Upon the occurrence of hardware failure within one of the communications transceivers 79–81, the switch matrix effectively bypasses the failed transceiver by coupling the antenna element nominally connected thereto to another communications transceiver. For example, assume that hardware failure renders communications transceiver 79 inoperative. Such failure may occur in the transceiver transmitter, transeiver receiver, or in a transceiver circuit element or device used both during signal transmission and reception. In this instance switch 82 is set to position 114a, switch 86 is set to 118c, and switch 106 is set to position 110c. The settings of switches 84, and 104 are maintained at the aforementioned nominal positions throughout such "failure mode" operation. As is indicated by FIG. 3, this state change in switches 82, 86, and 106 causes the signals from antenna elements 24 and 28 to be combined within combiner 94 and relayed to communications transceiver 81. In this way transceiver 79 may be bypassed until such time as the hardware failure detected therein is corrected, or until the transceiver 79 is itself replaced. In the interim, communication with users located in cell sectors S1 and S3 is handled by the communications transceiver 81, which is nominally assigned only to sector S3. TABLE I shows the positions to which each switch within matrix 74 is set during failure mode operation. Again, during normal operation the switches within the matrix 74 are set in order that the transceivers 79–81 respectively communicate with users in the sectors S1, S2 and S3.

TABLE I

| Transceiver Failure | Switch Positions Where X = don't care Switch # | | | | | |
|---|---|---|---|---|---|---|
| | 82 | 84 | 86 | 102 | 104 | 106 |
| Transceiver 79 | 114a | 90b | 118c | X | 110b | 110c |
| Transceiver 80 | 118a | 114b | 90c | 116a | X | 116c |
| Transceiver 81 | 90a | 118b | 114c | 110a | 116b | X |

Although operation of the switch matrix has been described within the context of an antenna receive mode, those skilled in the art will realize that reciprocal operation in the transmit mode is also possible using a substantially similar structure. For example, during transmit mode operation the combiners would be implemented to perform a signal splitting function rather than signal combining.

Figure 5A:
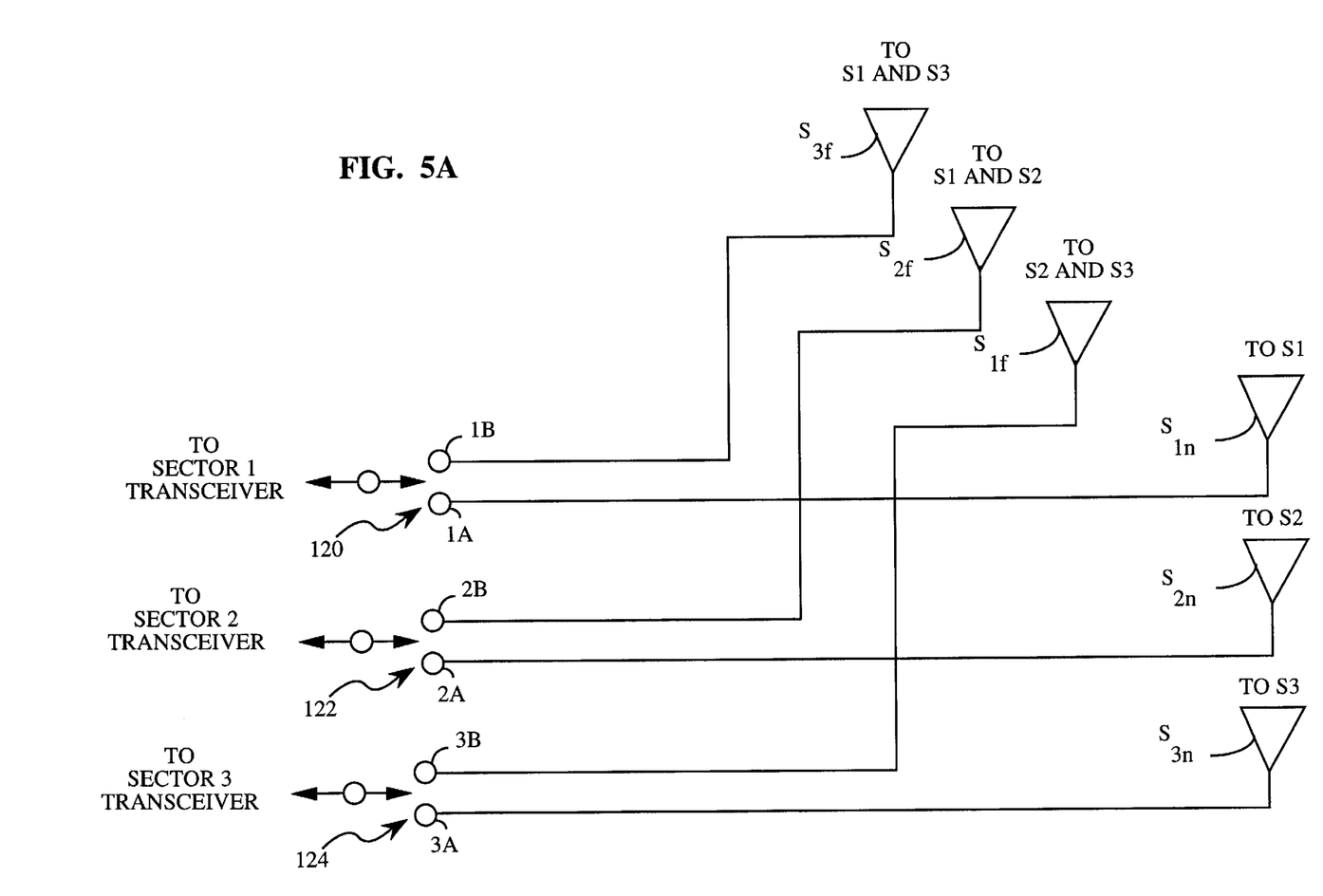
FIG. 5A provides a conceptual view of a dual-array base station antenna structure for providing redundant sector coverage.
Figure 5B:
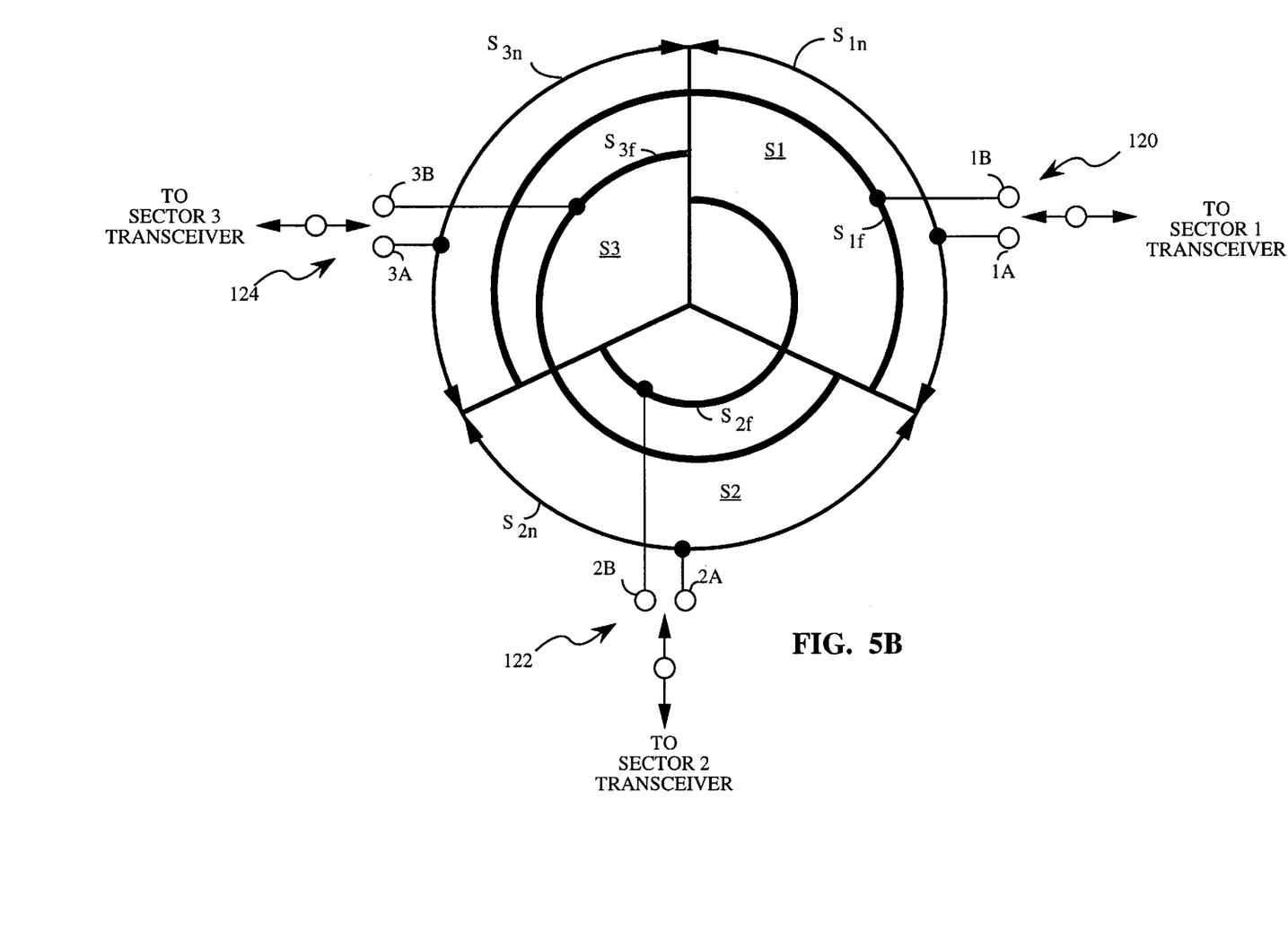
FIG. 5B illustratively represents the cell coverage of primary and redundant antenna arrays included within the dual-array antenna of FIG. 5A.

Turning to FIG. 5A, a conceptual view is provided of a dual-array antenna structure for providing redundant sector coverage. The dual-array structure of FIG. 5A includes a primary array of three 120 degree antennas $S_{1n}$, $S_{2n}$, $S_{3n}$, and a redundant or secondary array of three 240 degree antennas $S_{1f}$, $S_{2f}$ and $S_{3f}$. The antennas $S_{1n}$, $S_{2n}$, $S_{3n}$, are respectively directed to sectors S1, S2 and S3, while the antennas $S_{1f}$, $S_{2f}$ and $S_{3f}$ are each directed to two of the sectors S1–S3 (FIG. 5B). A switch matrix comprised of switches 120, 122 and 124 is provided for switchably connecting operative ones of the communication transceivers 79–81 to selected antennas within the secondary array upon failure of other ones of the transceivers. During normal operation, each of the transceivers 79–81 are respectively connected to one of the primary antennas $S_{1n}$, $S_{2n}$, $S_{3n}$ by setting the switches 120, 122, and 124 to positions 1A, 2A and 3A, respectively. Accordingly, during normal operation users within each of the sectors S1–S3 are respectively serviced by one of the communications transceivers 79–81.

As an example of failure mode operation, consider the case in which an error condition or failure is detected within transceiver 79. In this instance switch 122 is set to position 2B, which results in the projection of a 240 degree antenna beam over sectors S1 and S2 during failure mode operation. As a result, users within both the sectors S1 and S2 are serviced by the sector #2 communications transceiver 80. Similarly, switch 120 is set to position 1B upon failure of the sector #3 transceiver 81, which results in the sector #1 transceiver 79 handling users within both the sectors S1 and S3. In like manner switch 124 is set to position 3B in the event of inoperability of the sector #2 transceiver 80.

FIG. 5B illustratively represents the cell coverage of the primary and redundant antenna arrays. In particular, the primary antenna elements $S_{1n}$, $S_{2n}$, $S_{3n}$ are seen to be respectively directed to the sectors S1–S3. With regard to the redundant array, redundant element $S_{3f}$ encompasses sectors S1 and S3, redundant element $S_{2f}$ is directed over sectors S2 and S1, and redundant element $S_{1f}$ covers sectors S1 and S3.

In the dual-array approach exemplified by FIGS. 5A and 5B, upon failure of one of the communications transceivers 79–81 another transceiver 79–81 is switched from connection to a 120 degree antenna element to connection to a 240 degree element within a separate redundant array. However, in certain applications it may be desired to achieve the same form of redundancy without provision of a secondary or redundant array. Accordingly, in an alternate embodiment of the invention a single antenna array comprised of adjustable beam-width antenna elements is employed to achieve the desired coverage redundancy. The adjustable beam-width antenna elements may be realized using any of a number of specific implementations, two of which are described below.

Figure 6:
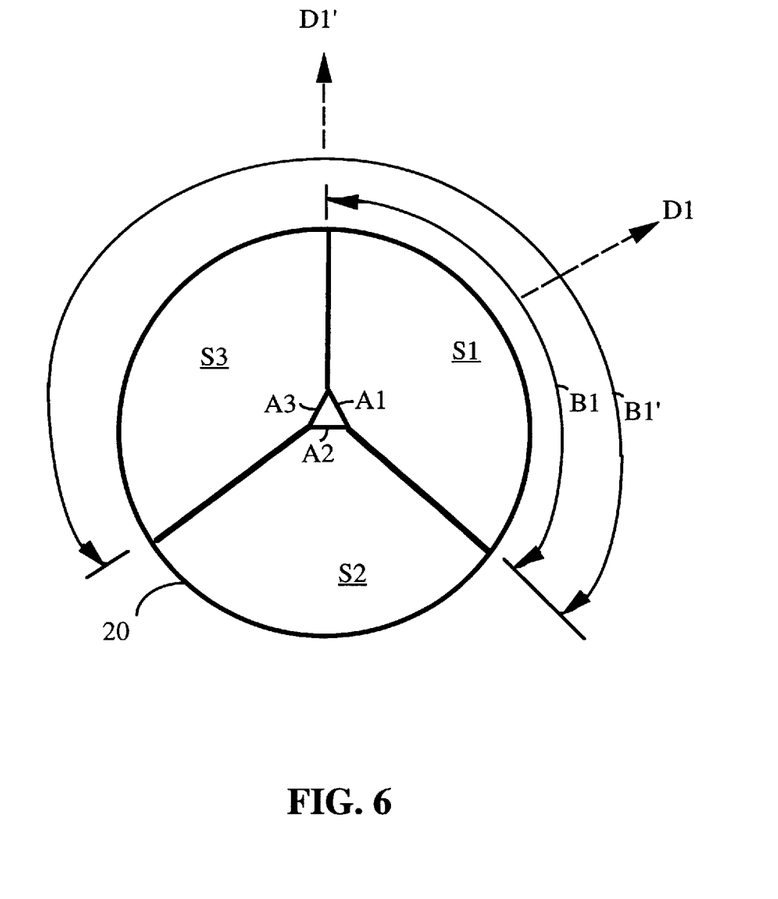
FIG. 6 shows an illustrative three-sectored cell in which switchable antenna elements are each nominally set to provide a 120 degree beam centered over one of the three cell sectors.

Within each of the single-array embodiments described below, the beam projected by each switchable element is adjusted in both breadth and direction when it becomes necessary provide back-up sector coverage. For example, FIG. 6 shows an illustrative three-sectored cell in which switchable antenna elements A1–A3 are each nominally set to provide a 120 degree beam centered over one of the sectors S1–S3. Upon failure of a communications transceiver connected to switchable antenna element A3, the beam projected by the switchable antenna element A1 will be rotated so as to be centered at the boundary between sectors S1 and S3, and will be broadened to 240 degrees. Referring to FIG. 6, the element A1 nominally projects a beam of azimuth width B1 (i.e., 120 degrees) centered about direction D1. Upon being switched, the switchable antenna element A1 projects a beam of azimuth width B1' (i.e., 240 degrees) in direction D1'. The sector S1 communications transceiver, which remains coupled to only the switchable antenna element A1 during both normal and failure-mode operation, is then used for communication with users in both the sectors S1 and S3. Users within sector S2 continue to be serviced by the sector S2 communications transceiver coupled to switchable antenna element A2.

In each of the single-array implementations generally represented by FIG. 6, each communications transceiver remains connected to one and only one switchable antenna element during operation in both normal and failure modes. This advantageously simplifies base station architecture by obviating the need for a switch matrix between the communication transceivers and the base station antenna elements.

Figure 7A:
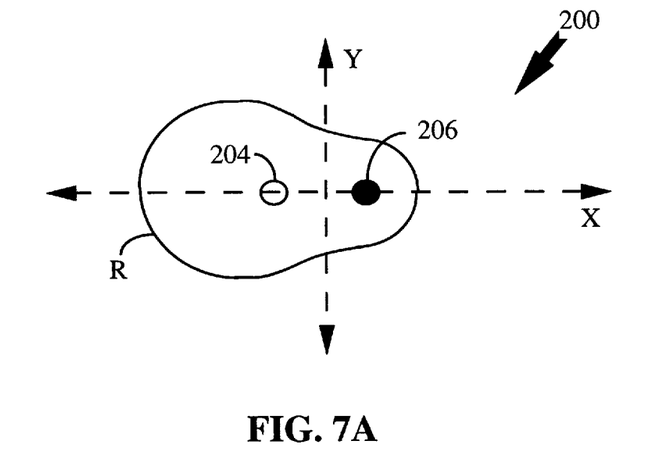
FIGS. 7A and 7B respectively show azimuth and side elevation views of a simplified representation of a switchable parasitic reflector antenna element.
Figure 7B:
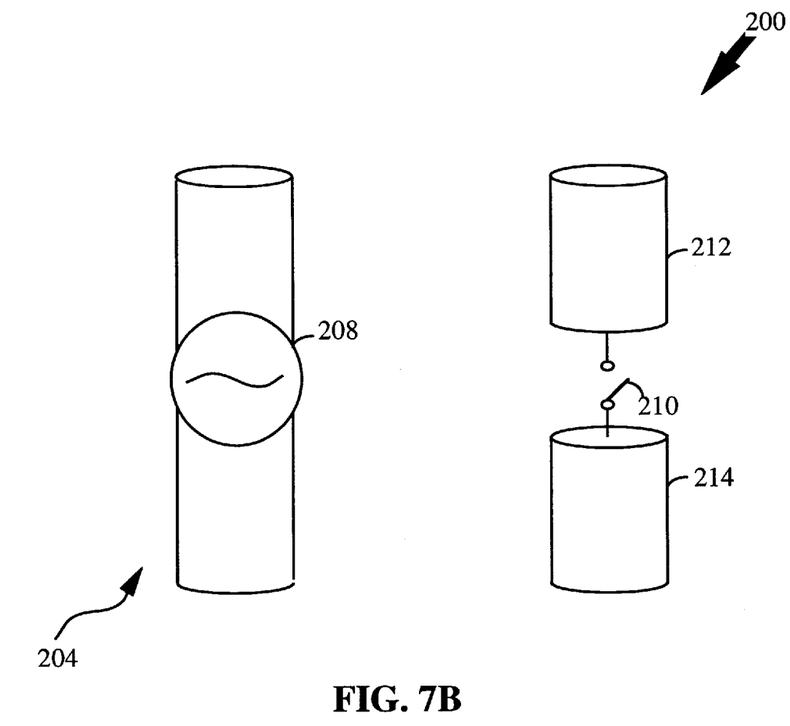

Referring to FIGS. 7A and 7B, there are respectively shown azimuth and side elevational views of a simplified representation of a switchable parasitic reflector antenna element 200. The switchable antenna element 200 includes a dipole radiator 204 and a switched parasitic reflector 206. The dipole radiator 204 and switched parasitic reflector 206 may each be realized using a thin, cylindrical electrical conductor. The dipole radiator 204 is conventionally driven by signal source, which is identified by reference number 208. If the electrical length of the switched parasitic reflector 206 is selected to be approximately 5% longer than the length of the dipole radiator 204, then the reflector 206 results in the projection of the directive radiation beam R of FIG. 7A.

As is indicated by FIG. 7B, the parasitic reflector 206 includes upper and lower conductor segments 212 and 214 switchably connected by a reflector switch 210. When the reflector switch 210 is closed, the switched parasitic reflector 206 resonates in the presence of electromagnetic emission by the dipole antenna 204, thereby forming the directive radiation beam R. Upon opening of the switch 210, the reflector 206 ceases to resonate and hence does not function as a reflective element. In accordance with the invention, several switched parasitic reflectors may be arranged proximate a dipole antenna in order to allow directive radiation beams of differing breadth and direction to be projected during normal and failure modes of operation. In the specific case of a three-sectored cell (FIG. 6), each of the three switchable base station antenna elements (A1–A3) may be realized using the configuration depicted in FIG. 8.

Figure 8:
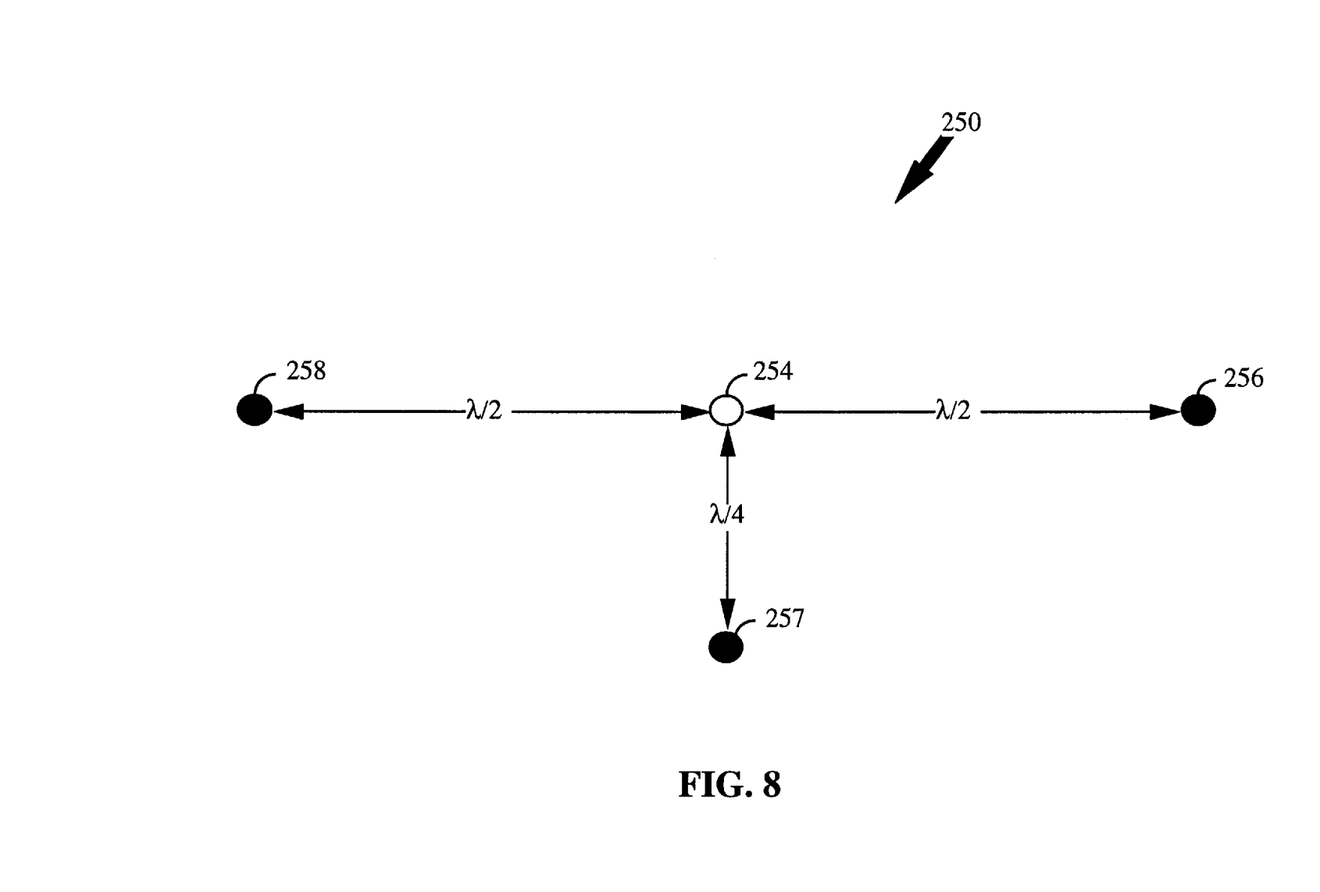
FIG. 8 provides an azimuth view of a switchable parasitic reflector antenna comprised of a dipole antenna and a set of three parasitic reflectors.

Turning now to FIG. 8, there is shown an azimuth view of a switchable parasitic reflector antenna 250 comprised of a dipole antenna 254 and a set of three parasitic reflectors 256–258. The parasitic reflectors 256–257 are substantially identical to the parasitic reflector 206 (FIG. 7A–B), and hence each includes a pair of conductor segments connected through a switch (not shown). The third parasitic reflector 258 is comprised of a single electrical conductor (i.e., an unswitched reflector) having a length approximately 5% greater than the dipole antenna 254. As is indicated by FIG. 8, the parasitic reflectors 256 and 258 are nominally spaced by ½ from the dipole antenna 254, and the parasitic reflector 257 is spaced by ¼ therefrom, where l denotes the wavelength of the emitted radiation.

By appropriately switching the parasitic reflectors 256–257, the antenna 250 is capable of alternately providing antenna beams of the width and direction required to be produced during normal and failure mode operation of the elements A1–A3. That is, the parasitic reflector element 250 is disposed to provide a 120 degree azimuth beam in a first direction (e.g., direction D1 in FIG. 6) during normal mode operation, and a second 240 degree azimuth beam in another angular direction (i.e., direction D1') during failure mode operation. During normal operation a 120 degree width beam is produced by closing the switch within each of the parasitic reflectors 256–257, while during failure mode a 240 degree beam is produced by preventing resonance of the reflectors 256–257 by opening the switches therein.

Figure 9A:
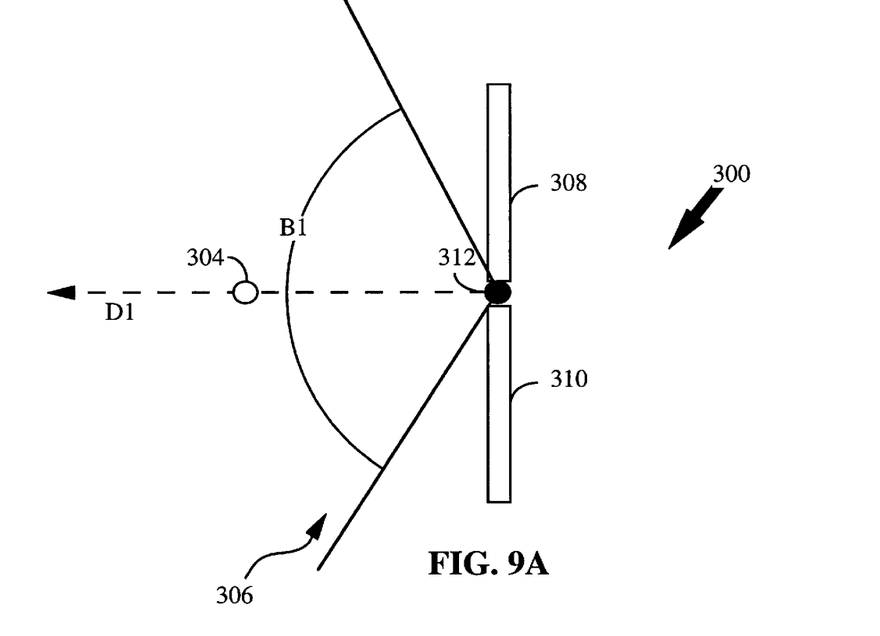
FIG. 9A shows an azimuth view of a simplified representation of a moveable-wedge reflector antenna comprised of a dipole antenna and a hinged reflector plate.

Referring to FIG. 9A, there is respectively shown an azimuth view of a moveable-wedge reflector antenna 300. The reflector antenna 300 is comprised of a dipole antenna 304 and a hinged reflector plate 306 spaced approximately ½ therefrom. The reflector plate 306 includes a pair of electrically conductive reflector panels 308, 310, which are joined by a hinge element 312. When the panels 308, 310 of the reflector plate 306 are set in the planar configuration of FIG. 9A, the antenna 300 projects a 120 degree beam in direction D1.

Figure 9B:
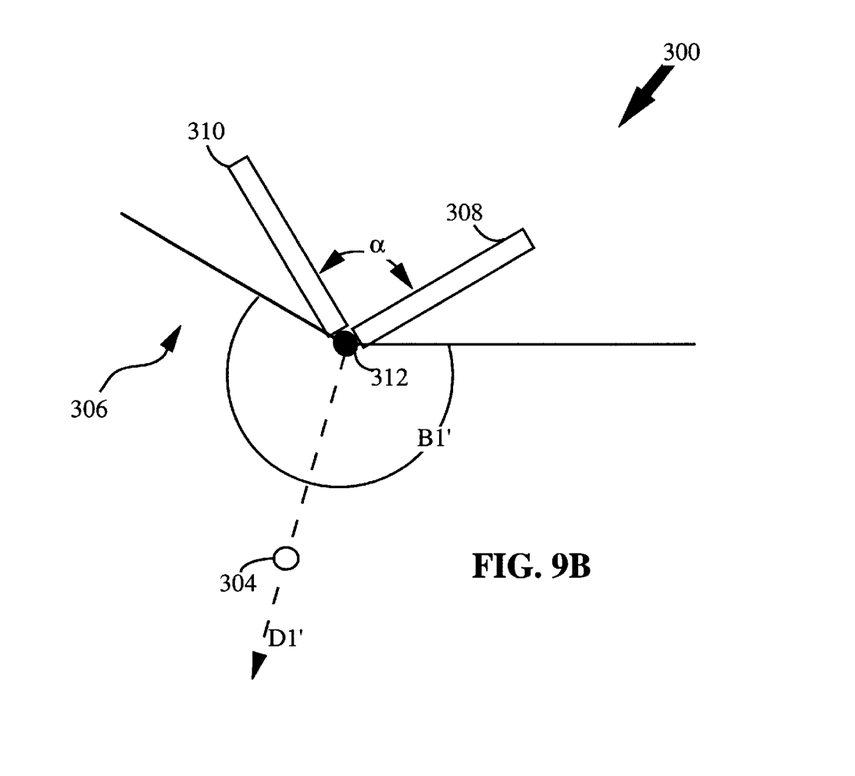
FIG. 9B illustrates the manner in which the moveable-wedge antenna of FIG. 9A is configured during failure mode operation.

In a preferred embodiment, the hinged reflector plate 306 is mounted upon an X-Y stage (not shown) in order that the hinged reflector plate 306 may be translated relative to the dipole antenna 304 during failure mode operation. As is indicated by FIG. 9B, this translation results in a beam being projected by the antenna 300 in direction D1' during failure mode operation. The beam width is set at 240 degrees during failure mode operation by adjusting the angle a between the reflector panels 308, 310 to approximately 90 degrees. This angular adjustment of the reflector panels 308, 310 may be effected by mechanical apparatus familiar to those skilled in the art.

The previous description of the preferred embodiments is provided to enable any person skilled in the art to make or use the present invention. The various modifications to these embodiments will be readily apparent to those skilled in the art, and the generic principles defined herein may be applied to other embodiments without the use of inventive faculty. For example, the teachings of the present invention are equally applicable to cellular systems in which are included cells of sectorizations other than those described herein. Thus, the present invention is not intended to be limited to the embodiments shown herein but is to be accorded the widest scope consistent with the principles and novel features disclosed herein.

We claim:

1. In a cellular subscriber communication system in which a cell-site is used to communicate information signals to and from users within a first cell having a plurality of sectors, said cell-site including a plurality of communication transceivers in communication through a sectored antenna arrangement with said users disposed in corresponding ones of said plurality of sectors, said sectored antenna arrangement comprising:

an antenna array having a plurality of antenna elements for projecting a corresponding plurality of antenna beams over said plurality of sectors; and an antenna feed network for connecting said antenna elements to selected ones of said communication transceivers, said antenna feed network including a combiner array for combining selected ones of said antenna beams upon one of said communication transceivers becoming inoperative, and a switch network for providing the resultant combined beam to an operative one of said communication transceivers.

2. The sectored antenna arrangement of claim 1 wherein said combiner array includes a plurality of combiner elements, each of said combiner elements being connected to adjacent ones of said antenna elements.

3. The sectored antenna arrangement of claim 2 wherein said switch network includes a first set of switches for connecting said antenna elements to said combiner elements, and a second set of switches for connecting said antenna elements and said combiner elements to said communication transceivers.

4. The sectored antenna arrangement of claim 3 wherein said first set of switches are set such that pairs of said antenna beams associated with first and second adjacent ones of said plurality of antenna elements are combined upon failure of operation of a first one of said communication transceivers, said first and second sets of switches being nominally set to connect said first communication transceiver to said first one of said plurality of antenna elements.

5. In a cellular subscriber communication system in which a cell-site is used to communicate information signals to and from users within a first cell having a plurality of sectors, said cell-site including a plurality of communication transceivers in communication through a sectored antenna arrangement with said users disposed in corresponding ones of said plurality of sectors, said sectored antenna arrangement comprising:

a first antenna array for projecting a first set of antenna beams wherein each antenna of said beams is projected over one of said sectors, each of said antenna beams being processed by one of said plurality of communication transceivers;

a second antenna array for projecting a second set of antenna beams, wherein each antenna beam within said second set is projected over a group of at least two of said sectors and is processed by one of said communication transceivers; and a switching network for selectively connecting said communication transceivers to said first and second antenna arrays.

6. The sectored antenna arrangement of claim 5 wherein said first antenna array includes a plurality of primary antenna elements disposed to project said antenna beams of said first set over a first azimuth beam width, and said second antenna array includes a like plurality of redundant antenna elements disposed to project said antenna beams of said second set over a second azimuth beam width approximately twice said first azimuth beam width.

7. The sectored antenna arrangement of claim 6 wherein said switching network includes an array of switches, each of said switches being disposed to selectively connect one of said communication transceivers to corresponding ones of said primary and secondary antenna elements.

8. In a cellular subscriber communication system in which a cell-site is used to communicate information signals to and from users within a first cell having a plurality of sectors, said cell-site including a plurality of communication transceivers in communication through a sectored antenna arrangement with said users disposed in corresponding ones of said plurality of sectors, said sectored antenna arrangement comprising:

an antenna array including a plurality of switchable antenna elements for projecting a set of variable-width antenna beams over said plurality of sectors, each of said switchable antenna elements being connected to one of said communication transceivers; and an antenna control network for adjusting beam width of a selected one of said variable-width antenna beams upon one of said communication transceivers becoming inoperative by switching configuration of an associated one of said switchable antenna elements.

9. The sectored antenna arrangement of claim 8 wherein each of said switchable antenna elements includes a dipole antenna proximate a first selectively resonant parasitic reflector.

10. The sectored antenna arrangement of claim 9 wherein said first selectively resonant parasitic reflector includes:

first and second conductor segments; and a first switch for switchably connecting said first and second conductor segments, said antenna control network placing said first switch in a closed state in order to provide a first beam width and in an open state to provide a second beam width.

11. The sectored antenna arrangement of claim 9 wherein each of said switchable antenna elements includes a second selectively resonant parasitic reflector and a solid parasitic reflector arranged proximate said dipole antenna.

12. The sectored antenna arrangement of claim 9 wherein each of said second selectively resonant parasitic reflectors includes:

third and fourth conductor segments; and a second switch for switchably connecting said third and fourth conductor segments, said antenna control network being operative to synchronize opening and closing of said first and second switches of each said switchable antenna elements.

13. The sectored antenna arrangement of claim 9 wherein said first selectively resonant parasitic reflector within the first of said switchable antenna elements is of slightly longer electrical length than the dipole antenna included within the first switchable antenna element.

14. The sectored antenna arrangement of claim 8 wherein each of said switchable antenna elements includes a dipole antenna proximate a hinged reflector wedge.

15. The sectored antenna arrangement of claim 14 wherein said hinged reflector wedge includes first and second wedge plates coupled to a common hinge element, said antenna control network including means for adjusting position of said first and second wedge plates.

16. In a cellular subscriber communication system in which a cell-site is used to communicate information signals to and from users within a first cell having a plurality of sectors, said cell-site including a plurality of communication transceivers in communication through a sectored antenna arrangement with said users disposed in corresponding ones of said plurality of sectors, said sectored antenna arrangement comprising:

an antenna array including a plurality of switchable antenna elements for projecting a set of variable-width antenna beams over said plurality of sectors, each of said switchable antenna elements including a set of radiative elements switchably connected to one of said communication transceivers;

an array of switches for switchably connecting said radiative elements to said communication transceivers; and an antenna control network for adjusting beam width of a selected one of said variable-width antenna beams upon one of said communication transceivers becoming inoperative by changing state of selected ones of said switches.

17. The sectored antenna arrangement of claim 16 wherein each of said switchable antenna elements includes a set of at least four radiative elements, and wherein each of said switches within said array is nominally in a closed position.

18. The sectored antenna arrangement of claim 17 wherein said antenna control network includes means for opening two of said switches connected to radiative elements within a selected one of said switchable antenna elements.

19. In a cellular subscriber communication system in which a cell-site is used to communicate information signals to and from users within a first cell having a plurality of sectors, said cell-site including a plurality of communication transceivers in communication through a sectored antenna arrangement with said users disposed in corresponding ones of said plurality of sectors, a method for providing redundant coverage of said sectors comprising the steps of:

projecting a plurality of antenna beams over said plurality of sectors using a corresponding plurality of antenna elements;

connecting said antenna elements to selected ones of said communication transceivers and combining selected ones of said antenna beams upon failure of one of said communication transceivers; and providing the resultant combined beam to an operative one of said communication transceivers.

20. In a cellular subscriber communication system in which a cell-site is used to communicate information signals to and from users within a first cell having a plurality of sectors, said cell-site including a plurality of communication transceivers in communication through a sectored antenna arrangement with said users disposed in corresponding ones of said plurality of sectors, a method for providing redundant coverage of said sectors comprising the steps of:

projecting a set of variable-width antenna beams over said plurality of sectors using a corresponding plurality of switchable antenna elements wherein selected ones of said switchable antenna elements are connected to corresponding ones of said communication transceivers; and adjusting beam width of a selected one of said variable-width antenna beams upon one of said communication transceivers becoming inoperative by switching configuration of an associated one of said switchable antenna elements.

\* \* \* \* \*